(12) United States Patent
Stoll

(10) Patent No.: US 8,397,784 B2
(45) Date of Patent: Mar. 19, 2013

(54) CORRECTION TAPE DISPENSER WITH VARIABLE CLUTCH MECHANISM

(75) Inventor: Henry W. Stoll, Bellevue, WA (US)

(73) Assignee: Sanford, L.P., Oak Brook, IL (US)

( * ) Notice: Subject to any disclaimer, the term of this patent is extended or adjusted under 35 U.S.C. 154(b) by 311 days.

(21) Appl. No.: 12/872,666

(22) Filed: Aug. 31, 2010

(65) Prior Publication Data

US 2012/0048476 A1 Mar. 1, 2012

(51) Int. Cl.
| | |
|---|---|
| *B32B 37/26* | (2006.01) |
| *B26F 3/02* | (2006.01) |
| *B43L 19/00* | (2006.01) |
| *F16D 13/60* | (2006.01) |

(52) U.S. Cl. ......... 156/577; 156/527; 156/579; 118/76; 118/200; 118/257; 242/588; 242/588.3; 242/588.6; 242/160.2; 242/160.4; 242/170; 242/171; 206/411; 192/54.5; 192/93 A

(58) Field of Classification Search .......... 156/523, 156/527, 538, 540, 574, 577, 579; 118/76, 118/200, 257; 225/46; 242/160.2, 160.4, 242/170, 171, 588, 588.2, 588.3, 588.6; 206/411; 74/125.5; 192/54.5, 93 A See application file for complete search history.

(56) References Cited

U.S. PATENT DOCUMENTS

| | | | |
|---|---|---|---|
| 198,777 | A | 1/1878 | Nicholson |
| 2,907,190 | A | 10/1959 | Pastor |
| 3,443,375 | A | 5/1969 | Cielaszyk |
| 4,374,588 | A * | 2/1983 | Ruggles ................. 482/118 |
| 4,462,272 | A * | 7/1984 | Roper ..................... 475/240 |
| 4,671,687 | A | 6/1987 | Tamai |
| 4,704,185 | A | 11/1987 | Fischer |
| 4,718,971 | A | 1/1988 | Summers |
| 4,750,878 | A | 6/1988 | Nix et al. |
| 4,826,562 | A | 5/1989 | Ehlis |

(Continued)

FOREIGN PATENT DOCUMENTS

| | | |
|---|---|---|
| CA | 2359324 A1 | 7/2000 |
| DE | 37 32 843 A1 | 3/1988 |

(Continued)

OTHER PUBLICATIONS

International Search Report for International Application No. PCT/US2011/049530, dated Nov. 3, 2011.

(Continued)

*Primary Examiner* — Mark A Osele

(74) *Attorney, Agent, or Firm* — Marshall, Gerstein & Borun LLP

(57) ABSTRACT

A clutch mechanism for a tape dispenser, for example, includes first and second coaxially disposed rotating disks, a pressure wheel, and a friction element. The first rotating disk defines at least one protrusion. The pressure wheel is disposed between the first and second rotating disks and is operably engaged by the at least one protrusion carried by the first rotating disk. The protrusion is movable between first and second rotational positions relative to the pressure wheel. The friction element is disposed between the pressure wheel and the second rotating disk such that the friction element generates a first frictional force between the pressure wheel and the second rotating disk when the protrusion is in the first rotational position and a second frictional force between the pressure wheel and the second rotating disk when the protrusion is in the second rotational position.

20 Claims, 5 Drawing Sheets

U.S. PATENT DOCUMENTS

| | | |
|---|---|---|
| 4,849,064 A | 7/1989 | Manusch et al. |
| 4,851,074 A | 7/1989 | Hiromichi |
| 4,851,076 A | 7/1989 | Manusch et al. |
| 4,853,074 A | 8/1989 | Manusch et al. |
| 4,891,090 A | 1/1990 | Lorincz et al. |
| 4,891,260 A | 1/1990 | Kunkel et al. |
| 4,997,512 A | 3/1991 | Manusch |
| 5,006,184 A | 4/1991 | Manusch et al. |
| 5,049,229 A | 9/1991 | Czech |
| 5,125,589 A | 6/1992 | Manusch |
| 5,135,798 A | 8/1992 | Muschter et al. |
| 5,150,851 A | 9/1992 | Manusch et al. |
| 5,221,577 A | 6/1993 | Inaba et al. |
| 5,242,725 A | 9/1993 | Weissmann et al. |
| 5,281,298 A | 1/1994 | Poisson et al. |
| 5,303,759 A | 4/1994 | Czech |
| 5,310,437 A | 5/1994 | Tucker |
| 5,310,445 A | 5/1994 | Tucker |
| 5,316,613 A | 5/1994 | Samuelson et al. |
| 5,346,580 A | 9/1994 | Elges et al. |
| 5,379,477 A | 1/1995 | Tamai et al. |
| 5,380,395 A | 1/1995 | Uchida |
| 5,393,368 A | 2/1995 | Stevens |
| 5,430,904 A | 7/1995 | Ono et al. |
| 5,462,633 A | 10/1995 | Manusch et al. |
| 5,472,560 A | 12/1995 | Horng |
| 5,480,510 A | 1/1996 | Manusch et al. |
| 5,490,898 A | 2/1996 | Koyama |
| 5,499,877 A | 3/1996 | Sakanishi et al. |
| 5,507,908 A | 4/1996 | Fukushima et al. |
| 5,512,128 A | 4/1996 | Manusch et al. |
| 5,556,469 A | 9/1996 | Koyama et al. |
| 5,595,626 A | 1/1997 | Yokouchi et al. |
| 5,679,156 A | 10/1997 | Matsumaru |
| 5,685,944 A | 11/1997 | Nose et al. |
| 5,700,552 A | 12/1997 | Katsuro et al. |
| 5,714,035 A | 2/1998 | Stevens |
| 5,759,270 A | 6/1998 | Lee |
| 5,759,341 A | 6/1998 | Kobayashi |
| 5,770,007 A | 6/1998 | Czech et al. |
| 5,772,840 A | 6/1998 | Morinaga |
| 5,785,437 A | 7/1998 | Koyama et al. |
| 5,792,263 A | 8/1998 | Koyama et al. |
| 5,795,085 A | 8/1998 | Yoo |
| 5,820,728 A | 10/1998 | Stevens et al. |
| D400,585 S | 11/1998 | Fritz et al. |
| 5,891,562 A | 4/1999 | Rutz et al. |
| 5,897,742 A | 4/1999 | Semmler |
| 5,942,036 A | 8/1999 | You |
| 5,997,994 A | 12/1999 | Matsushima |
| 6,000,455 A | 12/1999 | Semmler |
| 6,059,002 A | 5/2000 | Katami |
| 6,062,286 A | 5/2000 | Koyama et al. |
| 6,065,887 A | 5/2000 | You |
| 6,079,660 A | 6/2000 | Manusch et al. |
| 6,105,650 A | 8/2000 | Manusch et al. |
| 6,112,796 A | 9/2000 | Stevens |
| 6,125,903 A | 10/2000 | Uchida |
| 6,145,770 A | 11/2000 | Manusch et al. |
| 6,162,492 A | 12/2000 | Narayanan |
| 6,206,072 B1 | 3/2001 | Orihara et al. |
| 6,227,274 B1 | 5/2001 | Koyama et al. |
| 6,235,364 B1 | 5/2001 | Katsuro et al. |
| 6,260,599 B1 | 7/2001 | You |
| 6,270,578 B1 | 8/2001 | Murakoshi |
| 6,273,162 B1 | 8/2001 | Ohara et al. |
| 6,273,169 B1 | 8/2001 | Ono et al. |
| 6,273,982 B1 | 8/2001 | Semmler |
| 6,321,815 B1 | 11/2001 | You |
| 6,321,816 B1 | 11/2001 | Koreska |
| 6,325,130 B1 | 12/2001 | Kageyama et al. |
| 6,331,352 B1 | 12/2001 | Bradley et al. |
| 6,352,770 B1 | 3/2002 | Nienaber et al. |
| 6,360,805 B1 | 3/2002 | Takahashi |
| 6,363,990 B1 | 4/2002 | Kozaki |
| 6,363,992 B1 | 4/2002 | Semmler |
| 6,379,461 B1 | 4/2002 | Masumoto |
| 6,418,997 B1 | 7/2002 | Tamai et al. |
| 6,422,284 B1 | 7/2002 | Kelders et al. |
| 6,432,515 B1 | 8/2002 | Titze et al. |
| 6,435,248 B1 | 8/2002 | Masumoto |
| 6,450,231 B1 | 9/2002 | Ishikawa |
| 6,453,969 B1 | 9/2002 | Ferrara |
| 6,454,856 B1 | 9/2002 | Jung |
| 6,461,068 B1 | 10/2002 | Holmes |
| 6,481,485 B1 | 11/2002 | Herrmannsen et al. |
| 6,499,524 B1 | 12/2002 | Miller et al. |
| 6,500,259 B1 | 12/2002 | Tamai et al. |
| 6,500,509 B1 | 12/2002 | Katsuro et al. |
| 6,521,045 B1 | 2/2003 | Koyama et al. |
| 6,558,058 B2 | 5/2003 | Masumoto |
| 6,565,657 B2 | 5/2003 | Huthmacher |
| 6,568,450 B1 | 5/2003 | Stevens |
| 6,575,220 B2 | 6/2003 | Tamai et al. |
| 6,582,514 B1 | 6/2003 | Yang |
| 6,595,260 B2 | 7/2003 | Tamai et al. |
| 6,599,363 B2 | 7/2003 | Narita |
| 6,601,632 B2 | 8/2003 | Bouveresse et al. |
| 6,620,238 B2 | 9/2003 | Tsuda et al. |
| 6,622,768 B2 | 9/2003 | You |
| 6,629,552 B1 | 10/2003 | Herrmannsen et al. |
| 6,641,141 B2 | 11/2003 | Schroeder |
| 6,675,856 B2 | 1/2004 | Kozaki |
| 6,681,827 B2 | 1/2004 | Tamai et al. |
| 6,702,491 B2 | 3/2004 | Kobayashi |
| 6,729,377 B2 | 5/2004 | Huthmacher |
| 6,730,186 B2 | 5/2004 | Takahashi |
| 6,732,781 B2 | 5/2004 | Bouveresse |
| 6,732,782 B2 | 5/2004 | Rollion |
| 6,739,369 B2 | 5/2004 | Watanabe |
| 6,745,808 B2 | 6/2004 | Kobayashi |
| 6,761,200 B2 | 7/2004 | Shinya |
| 6,769,470 B2 | 8/2004 | Tamai et al. |
| 6,776,209 B1 | 8/2004 | You |
| 6,783,293 B2 | 8/2004 | Watanabe et al. |
| 6,792,664 B2 | 9/2004 | Herrmannsen et al. |
| 6,796,355 B2 | 9/2004 | Huthmacher et al. |
| 6,802,354 B2 | 10/2004 | Bouveresse |
| 6,805,762 B2 | 10/2004 | Narita et al. |
| 6,808,565 B1 | 10/2004 | Koyama et al. |
| 6,817,398 B2 | 11/2004 | Huthmacher et al. |
| 6,830,089 B1 | 12/2004 | Tamai et al. |
| 6,852,409 B2 | 2/2005 | Bradley et al. |
| 6,896,734 B2 | 5/2005 | Nishioka et al. |
| 6,905,545 B2 | 6/2005 | Tominaga |
| 6,945,492 B2 | 9/2005 | Koreska |
| 6,951,431 B2 | 10/2005 | Rollion |
| 6,966,715 B2 | 11/2005 | Narita et al. |
| 6,997,229 B2 | 2/2006 | Marschand et al. |
| 7,044,187 B2 | 5/2006 | Bebensee et al. |
| 7,059,374 B2 | 6/2006 | Mitsui et al. |
| 7,063,120 B2 | 6/2006 | Huthmacher et al. |
| 7,093,641 B2 | 8/2006 | Sharp |
| 7,093,642 B2 | 8/2006 | Sharp et al. |
| 7,117,915 B2 | 10/2006 | Rolion |
| 7,118,064 B2 | 10/2006 | Schneider |
| 7,121,948 B2 | 10/2006 | Huthmacher et al. |
| 7,163,040 B2 | 1/2007 | Marschand et al. |
| 7,187,573 B2 | 3/2007 | Terada et al. |
| 7,201,961 B2 | 4/2007 | Narimatsu et al. |
| D541,863 S | 5/2007 | Gerules |
| D542,351 S | 5/2007 | Rolion et al. |
| D542,845 S | 5/2007 | Suzuki |
| D542,846 S | 5/2007 | Suzuki |
| D543,238 S | 5/2007 | Suzuki |
| D543,239 S | 5/2007 | Suzuki |
| D543,240 S | 5/2007 | Suzuki |
| D543,241 S | 5/2007 | Herrmannsen et al. |
| D543,242 S | 5/2007 | Rushe et al. |
| 7,228,882 B2 | 6/2007 | Marschand et al. |
| D549,322 S | 8/2007 | Stallard et al. |
| 7,275,578 B2 | 10/2007 | Mitsui et al. |
| 7,302,984 B2 | 12/2007 | Mitsui et al. |
| D562,404 S | 2/2008 | Jansen et al. |
| 7,325,583 B2 | 2/2008 | Watanabe |
| 7,334,622 B2 | 2/2008 | Stade |
| 7,374,625 B2 | 5/2008 | Panetta et al. |

| | | | |
|---|---|---|---|
| D570,917 S | 6/2008 | Bailey et al. | |
| D570,918 S | 6/2008 | Rushe | |
| D571,403 S | 6/2008 | Rolion et al. | |
| D573,194 S | 7/2008 | Rushe et al. | |
| D573,195 S | 7/2008 | Rushe et al. | |
| D573,645 S | 7/2008 | Sommers et al. | |
| D574,431 S | 8/2008 | Kouda | |
| D574,432 S | 8/2008 | Kouda | |
| D574,892 S | 8/2008 | Kouda | |
| D577,117 S | 9/2008 | Biener et al. | |
| D579,499 S | 10/2008 | Rushe et al. | |
| 7,438,489 B2 | 10/2008 | Fujii | |
| D579,980 S | 11/2008 | Rushe et al. | |
| D579,981 S | 11/2008 | Maczuzak et al. | |
| D580,497 S | 11/2008 | Dureiko et al. | |
| D580,984 S | 11/2008 | Kouda | |
| D588,644 S | 3/2009 | Kobayashi | |
| D588,646 S | 3/2009 | Vulpitta | |
| D591,354 S | 4/2009 | Vulpitta | |
| RE40,885 E | 9/2009 | Sharp | |
| D600,751 S | 9/2009 | Gallay | |
| D603,903 S | 11/2009 | Gallay | |
| D607,055 S | 12/2009 | Koreska | |
| 7,681,616 B2 | 3/2010 | Marschand et al. | |
| 7,713,606 B2 | 5/2010 | Kasahara et al. | |
| 7,743,810 B2 | 6/2010 | Rolion et al. | |
| D619,655 S | 7/2010 | Suzuki | |
| D620,526 S | 7/2010 | Suzuki | |
| D620,527 S | 7/2010 | Suzuki | |
| D620,528 S | 7/2010 | Suzuki | |
| 7,748,564 B2 | 7/2010 | Kinugasa et al. | |
| D623,231 S | 9/2010 | Suzuki | |
| 2002/0170683 A1 | 11/2002 | Tamai et al. | |
| 2003/0226733 A1 | 12/2003 | Huthmacher et al. | |
| 2004/0031873 A1 | 2/2004 | Koreska | |
| 2005/0072529 A1 | 4/2005 | Yonezawa et al. | |
| 2005/0155717 A1 | 7/2005 | Mitsui et al. | |
| 2006/0151119 A1 | 7/2006 | Klauck et al. | |
| 2006/0151657 A1 | 7/2006 | Matsushita | |
| 2007/0107851 A1 | 5/2007 | Marschand et al. | |
| 2007/0189829 A1 | 8/2007 | Matsushita et al. | |
| 2008/0078323 A1 | 4/2008 | Hyodo | |
| 2008/0264753 A1 | 10/2008 | Rolion et al. | |
| 2008/0277070 A1 | 11/2008 | Rolion et al. | |
| 2008/0277517 A1 | 11/2008 | Hyodo | |
| 2008/0283194 A1 | 11/2008 | Mitsui et al. | |
| 2008/0308237 A1 | 12/2008 | Rolion et al. | |
| 2009/0025884 A1 | 1/2009 | Kinugasa et al. | |
| 2009/0026302 A1 | 1/2009 | Kinugasa et al. | |
| 2009/0028620 A1 | 1/2009 | Kinugasa et al. | |
| 2009/0050275 A1 | 2/2009 | Sakanishi | |
| 2009/0179061 A1 | 7/2009 | Dureiko et al. | |
| 2009/0202818 A1 | 8/2009 | Kasahara et al. | |
| 2009/0266466 A1 | 10/2009 | Yamamoto et al. | |
| 2010/0018653 A1 | 1/2010 | Dureiko et al. | |
| 2010/0116440 A1 | 5/2010 | Kai et al. | |
| 2010/0206488 A1 | 8/2010 | Matsushita et al. | |

FOREIGN PATENT DOCUMENTS

| | | |
|---|---|---|
| DE | 38 34 097 C1 | 3/1990 |
| DE | 39 02 553 C1 | 4/1990 |
| DE | 38 42 350 A1 | 6/1990 |
| DE | 39 11 402 A1 | 10/1990 |
| DE | 40 34 145 A1 | 10/1991 |
| DE | 40 39 683 A1 | 6/1992 |
| DE | 41 04 331 A1 | 8/1992 |
| DE | 41 20 031 C1 | 10/1992 |
| DE | 42 17 294 A1 | 12/1993 |
| DE | 42 17 295 A1 | 12/1993 |
| DE | 42 20 712 A1 | 1/1994 |
| DE | 43 22 117 C1 | 11/1994 |
| DE | 196 05 811 C1 | 10/1996 |
| DE | 195 33 567 A1 | 3/1997 |
| DE | 196 04 617 A1 | 8/1997 |
| DE | 196 35 587 A1 | 3/1998 |
| DE | 298 01 395 U1 | 5/1998 |
| DE | 199 09 217 A1 | 9/1999 |
| DE | 198 24 551 A1 | 12/1999 |
| DE | 101 00 932 A1 | 7/2002 |
| DE | 201 21 351 U1 | 7/2002 |
| DE | 102 14 604 A1 | 10/2003 |
| DE | 10 2004 026 720 A1 | 12/2005 |
| EP | 0 064 358 A1 | 11/1982 |
| EP | 0 270 736 A1 | 6/1988 |
| EP | 0 427 870 A1 | 5/1991 |
| EP | 0 551 522 A1 | 7/1993 |
| EP | 0 679 597 A2 | 11/1995 |
| EP | 0 695 645 A1 | 2/1996 |
| EP | 0717000 A2 | 6/1996 |
| EP | 0 727 378 A1 | 8/1996 |
| EP | 0 755 889 A1 | 1/1997 |
| EP | 0 767 128 A2 | 4/1997 |
| EP | 0 963 934 A1 | 12/1999 |
| EP | 1 306 338 A1 | 5/2003 |
| EP | 1 736 677 A1 | 12/2006 |
| EP | 1 808 395 A1 | 7/2007 |
| EP | 2 070 856 A1 | 6/2009 |
| FR | 2 559 221 A3 | 8/1985 |
| GB | 2 196 607 A | 5/1988 |
| IT | 287 492 | 7/1931 |
| JP | 4-275839 A | 10/1992 |
| JP | 4-281147 A | 10/1992 |
| JP | 4-283696 A | 10/1992 |
| JP | 4-294830 A | 10/1992 |
| JP | 4-312927 A | 11/1992 |
| JP | 4-316771 A | 11/1992 |
| JP | 4-319323 A | 11/1992 |
| JP | 4-327619 A | 11/1992 |
| JP | 4-327632 A | 11/1992 |
| JP | 4-338025 A | 11/1992 |
| JP | 4-345384 A | 12/1992 |
| JP | 4-354760 A | 12/1992 |
| JP | 4-367221 A | 12/1992 |
| JP | 4-371463 A | 12/1992 |
| JP | 6 127774 A | 5/1994 |
| JP | 10-250290 A | 9/1998 |
| JP | 10250290 A | 9/1998 |
| JP | 2000 296696 A | 10/2000 |
| JP | 2002-036686 A | 2/2002 |
| JP | 2002-067586 A | 3/2002 |
| JP | 2004-188804 A | 7/2004 |
| JP | 2004-299249 A | 10/2004 |
| JP | 2004299249 A | 10/2004 |
| JP | 2005-178153 A | 7/2005 |
| JP | 2005-262448 A | 9/2005 |
| JP | 2005-271493 A | 10/2005 |
| JP | 2005-288981 A | 10/2005 |
| JP | 2006-068962 A | 3/2006 |
| JP | 2006-069031 A | 3/2006 |
| JP | 2006-069035 A | 3/2006 |
| JP | 2006-169415 A | 6/2006 |
| JP | 2006-181425 A | 7/2006 |
| JP | 2006-205443 A | 8/2006 |
| JP | 2006-348234 A | 12/2006 |
| JP | 2006-348236 A | 12/2006 |
| JP | 2007-069529 A | 3/2007 |
| JP | 2007-137956 A | 6/2007 |
| JP | 2007-161802 A | 6/2007 |
| JP | 2007-168146 A | 7/2007 |
| JP | 2007-175886 A | 7/2007 |
| JP | 2007-182534 A | 7/2007 |
| JP | 2007-196541 A | 8/2007 |
| JP | 2007-301835 A | 11/2007 |
| JP | 2007-326960 A | 12/2007 |
| JP | 2008-001023 A | 1/2008 |
| JP | 2008-023871 A | 2/2008 |
| JP | 2008-080660 A | 4/2008 |
| JP | 2008-093951 A | 4/2008 |
| JP | 2008-105194 A | 5/2008 |
| JP | 2008-156041 A | 7/2008 |
| JP | 2008-221556 A | 9/2008 |
| JP | 2008-221775 A | 9/2008 |
| JP | 2008-238650 A | 10/2008 |
| JP | 2008-254879 A | 10/2008 |
| JP | 2008-265042 A | 11/2008 |
| JP | 2008-279642 A | 11/2008 |
| JP | 2008-279719 A | 11/2008 |
| JP | 2008-307815 A | 12/2008 |

| | | | |
|---|---|---|---|
| JP | 2009-013199 A | 1/2009 |
| JP | 2009-137752 A | 6/2009 |
| JP | 2009-143065 A | 7/2009 |
| JP | 2009-154382 A | 7/2009 |
| JP | 2009-160761 A | 7/2009 |
| JP | 2009-255330 A | 11/2009 |
| JP | 2009-262347 A | 11/2009 |
| JP | 2009-262348 A | 11/2009 |
| JP | 2009-285883 A | 12/2009 |
| JP | 2009-285884 A | 12/2009 |
| JP | 2009-286046 A | 12/2009 |
| JP | 2009-297909 A | 12/2009 |
| JP | 2010-017855 A | 1/2010 |
| JP | 2010-017992 A | 1/2010 |
| JP | 2010-069827 A | 4/2010 |
| JP | 2010-076455 A | 4/2010 |
| JP | 2010-083086 A | 4/2010 |
| JP | 2010-105309 A | 5/2010 |
| WO | WO-2008/116702 A1 | 0/2008 |
| WO | WO-97/46475 A1 | 2/1997 |
| WO | WO-98/41407 A1 | 9/1998 |
| WO | WO-99/37569 A1 | 7/1999 |
| WO | WO-2005/108113 A1 | 11/2005 |
| WO | WO-2005/108260 A1 | 11/2005 |
| WO | WO-2006/128559 A1 | 2/2006 |
| WO | WO-2006/054895 A1 | 5/2006 |
| WO | WO-2008/003714 A1 | 1/2008 |
| WO | WO-2008/133070 A1 | 1/2008 |
| WO | WO-2008/133071 A1 | 1/2008 |
| WO | WO-2008/038660 A1 | 4/2008 |
| WO | WO-2008/038661 A1 | 4/2008 |
| WO | WO-2008/078534 A1 | 7/2008 |
| WO | WO-2008/078535 A1 | 7/2008 |
| WO | WO-2008/078536 A1 | 7/2008 |
| WO | WO-2008/149936 A1 | 12/2008 |
| WO | WO-2008/153659 A2 | 12/2008 |
| WO | WO-2009/026439 A1 | 2/2009 |
| WO | WO-2009/077494 A1 | 6/2009 |
| WO | WO-2010/015519 A1 | 2/2010 |
| WO | WO-2010/023229 A1 | 3/2010 |
| WO | WO-2010/038604 A1 | 4/2010 |

OTHER PUBLICATIONS

Written Opinion of International Search Report for International Application No. PCT/US2011/049530, dated Nov. 3, 2011.

* cited by examiner

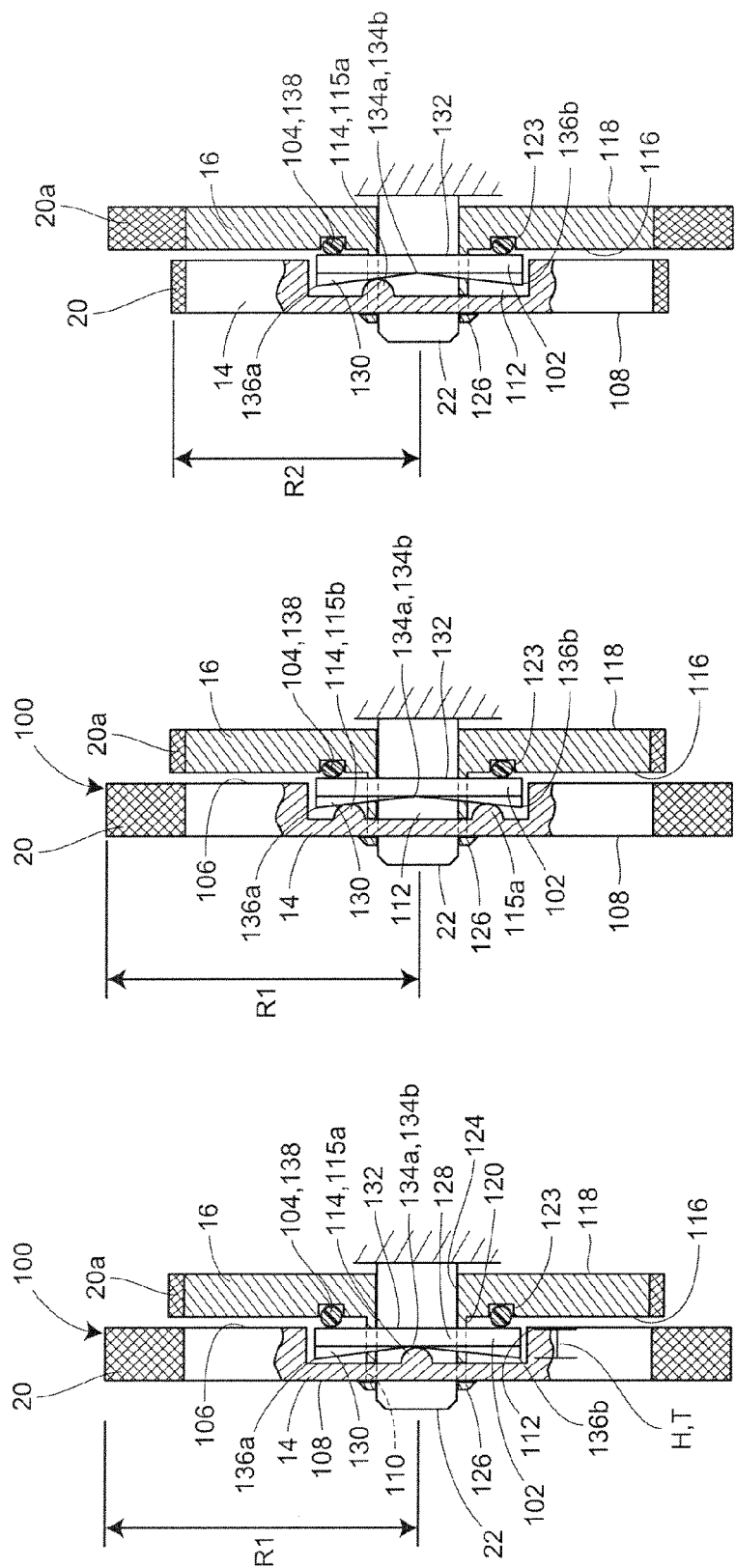

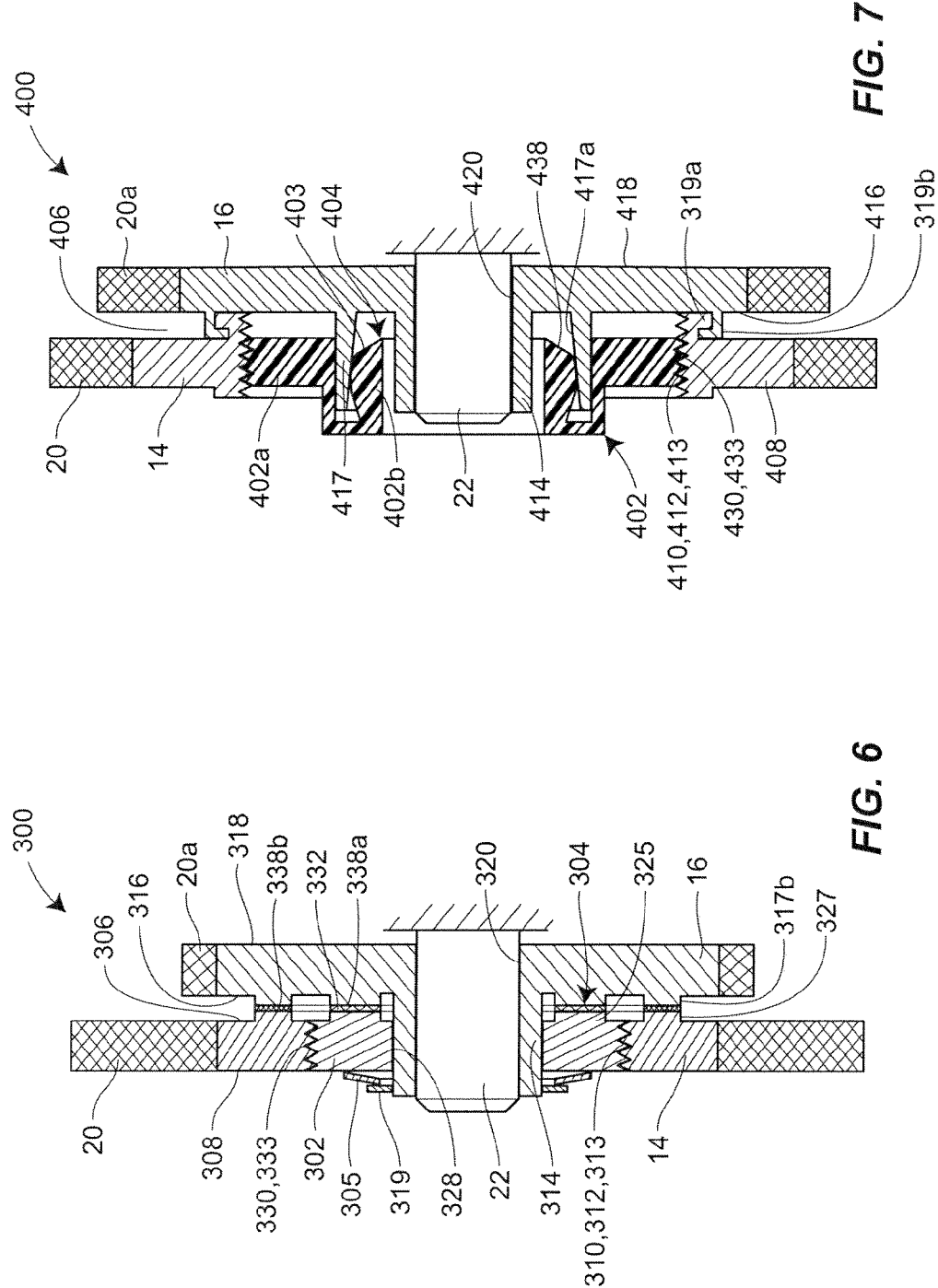

CORRECTION TAPE DISPENSER WITH VARIABLE CLUTCH MECHANISM

FIELD OF THE DISCLOSURE

The present disclosure is directed to clutch mechanisms and, more particularly, to correction tape dispensers having clutch mechanisms.

BACKGROUND

Correction tape dispensers can be used to cover mistakes made on a substrate, such as a sheet of paper, including writing or typing errors. In a common example, a correction tape dispenser includes a housing inside which a supply reel and a take-up reel are disposed. A carrier ribbon has a first end wound about the supply reel and a second end wound about a take-up reel. One side of the carrier ribbon is coated with a corrective coating that is used to cover a mistake on a substrate. Some known correction tape dispensers exist, which have supply and take-up reels that rotate about a common axis with the supply reel being coupled to drive the take-up reel through a clutch mechanism.

An applicator tip having a platform with a front edge is attached to the housing with the front edge being outside the housing. The applicator tip assists in the transfer of the corrective coating from the carrier ribbon to the paper.

The housing can be held in a consumer's hand during use. In passing from the supply reel to the take-up reel, the carrier ribbon is directed to the applicator tip, across the platform, around the front edge, and back to the take-up reel. The front edge of the applicator tip creates a sharp bend in the ribbon to assist in releasing the corrective coating from the ribbon. The front edge presses the carrier ribbon against the surface of a sheet of paper or other substrate in order to transfer the corrective coating from the carrier ribbon onto the paper so as to cover a mistake made thereon and to facilitate the correction of the mistake.

As the front edge is moved across the paper, carrier ribbon with a fresh corrective coating is drawn from the supply reel while the take-up reel is driven to wind up the carrier ribbon which has passed over the front edge and hence from which the corrective coating has been removed. Thus, a straight continuous strip of corrective coating is laid down on the paper surface until the forward movement of the applicator tip is stopped and the tip is lifted away from the paper.

With such correction tape dispensers, it is well known that the pulling force required to apply the correction tape to the substrate grows steadily throughout the life of the product while the torque required to draw the correction tape off of the supply reel remains substantially constant. The torque equals the pulling force multiplied by the radius of the correction tape stored on the supply reel. It is intuitive that the radius of the supply reel decreases as the supply of correction tape decreases. Therefore, to maintain a constant torque, the pulling force applied to the correction tape must be increased to offset the decrease in the radius of tape.

SUMMARY

The disclosed variable clutch mechanism advantageously facilitates matching of the rotational speeds of the supply and take up reels throughout the lifetime of a tape transfer product, thereby providing the consumer with a more user friendly mechanism for applying tape. More specifically, the variable clutch mechanism automatically adjusts the rate at which the take-up reel rotates relative to the supply reel to ensure that the tape ribbon is smoothly transferred from the supply reel such that the carrier ribbon is collected by the take-up reel without generating too much or too little tension in the correction tape ribbon and/or carrier ribbon, thereby avoiding operational inconsistencies such as tearing and/or looping.

One aspect of the present disclosure is directed to a clutch mechanism including a first rotating disk, a second rotating disk, a pressure wheel, and a friction element. The first rotating disk defines at least one protrusion. The second rotating disk is disposed coaxially with the first rotating disk. The pressure wheel is disposed coaxially with and between the first and second rotating disks. The pressure wheel is operably engaged by the at least one protrusion carried by the first rotating disk. The at least one protrusion is movable between at least a first rotational position and a second rotational position relative to the pressure wheel. The friction element is disposed between the pressure wheel and the second rotating disk such that the friction element generates a first frictional force between the pressure wheel and the second rotating disk when the at least one protrusion is in the first rotational position and a second frictional force between the pressure wheel and the second rotating disk when the at least one protrusion is in the second rotational position.

Another aspect of the present disclosure is directed to a correction tape dispenser including a housing, an applicator head carried by the housing, a supply reel, a take-up reel, a pressure wheel, and a friction element. The supply reel is supported within the housing and adapted to carry a supply of correction tape disposed on a carrier ribbon to be applied to a substrate by the applicator head. Moreover, the supply reel defines at least one protrusion. The take-up reel is supported within the housing and disposed coaxially with the supply reel for collecting the carrier ribbon after the correction tape has been applied to the substrate by the applicator head. The pressure wheel is disposed coaxially with and between the supply and take-up reels and operably engaged by the at least one protrusion of the supply reel. The at least one protrusion is movable between at least a first rotational position and a second rotational position relative to the pressure wheel. The friction element is disposed between the pressure wheel and the take-up reel such that the friction element generates a first frictional force between the supply and take-up reels when the at least one protrusion is in the first rotational position and a second frictional force between the supply and take-up reels when the at least one protrusion is in the second rotational position.

Another aspect of the present disclosure is directed to a correction tape dispenser including a housing, a supply reel, a take-up reel, a carrier ribbon, a pressure wheel, and an o-ring. The housing carries an applicator head and a shaft. The supply reel is rotationally supported on the shaft and defining a nub. The take-up reel is rotationally supported on the shaft adjacent to the supply reel. The carrier ribbon carries a supply of correction tape and extends from the supply reel, around the applicator head, and to the take-up reel. The pressure wheel is disposed on the shaft between the supply and take-up reels and defines a cammed surface that is operably engaged by the nub of the supply reel. The supply reel is movable relative to the pressure wheel such that the nub is movable relative to the cammed surface between at least a first rotational position and a second rotational position. The pressure wheel is movable relative to the supply reel between at least a first axial position when the nub is in the first rotational position and a second axial position when the nub is in the second rotational position. The o-ring is disposed between the pressure wheel and the take-up reel such that the o-ring occupies a first state of compression and generates a first frictional force between the supply and take-up reels when the nub is in the first rotational position and the pressure wheel is in the first axial position, and a second state of compression generating second frictional force between the supply and take-up reels when the nub is in the second rotational position and the pressure wheel is in the second axial position.

BRIEF DESCRIPTION OF THE DRAWINGS

FIGS. 3A-3C are partial cross-sectional side views of one embodiment of a variable clutch mechanism incorporated into a correction tape dispenser and constructed in accordance with the principles of the present disclosure;

FIG. 6 is a partial cross-sectional side view of yet another alternative embodiment of a variable clutch mechanism incorporated into a correction tape dispenser and constructed in accordance with the principles of the present disclosure;

FIG. 7 is a partial cross-sectional side view of still another alternative embodiment of a variable clutch mechanism incorporated into a correction tape dispenser and constructed in accordance with the principles of the present disclosure.

DETAILED DESCRIPTION

The present disclosure is directed to a variable clutch mechanism and a correction tape dispenser including a variable clutch mechanism to help ensure consistent application of the correction tape. The variable clutch mechanism described herein is not limited to being used in a correction tape dispenser, but rather, could foreseeably be used in any other device that might benefit from its functional aspects including but not limited to other transfer tape mechanisms such as mechanisms for transferring fluorescent "highlighter" type tapes or double-sided adhesive tapes, for example. The disclosed variable clutch mechanism advantageously reduces the difference in pulling force required to apply the correction tape throughout the lifetime of the product, and preferably facilitates the use of substantially the same pulling force to apply the correction (or other) tape to the substrate throughout the lifetime of the product, thereby making the device easier to use and more consistent over the lifetime of the product. Additionally, the variable clutch mechanism automatically adjusts the rate at which the take-up reel rotates relative to the supply reel to ensure that the tape ribbon is smoothly transferred from the supply reel such that the carrier ribbon is collected by the take-up reel without generating too much or too little tension in the correction tape ribbon and/or carrier ribbon, thereby avoiding operational inconsistencies such as tearing and/or looping.

Figure 1:
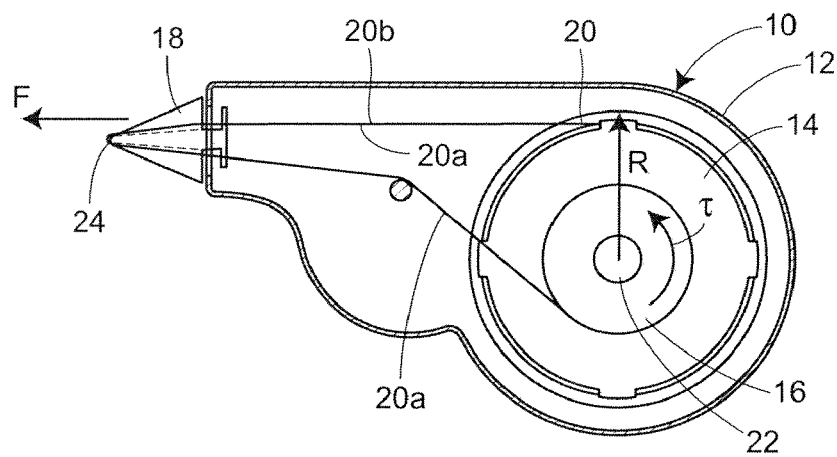
FIG. 1 is a side partial cross-sectional view of a correction tape dispenser including a variable clutch mechanism and constructed in accordance with the principles of the present disclosure.
Figure 2:
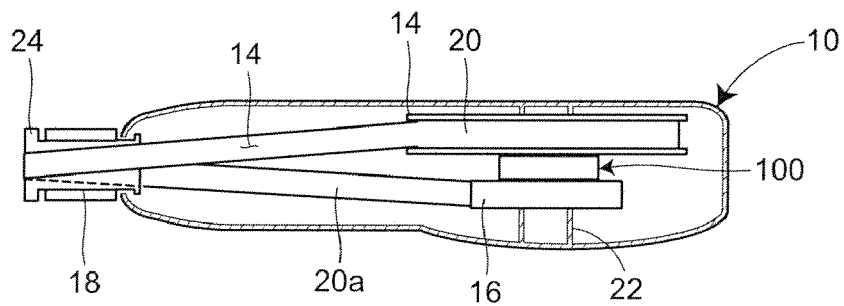
FIG. 2 is a top partial cross-sectional view of the correction tape dispenser of FIG. 1.

FIGS. 1 and 2 depict one embodiment of a correction tape dispenser 10 constructed in accordance with the principles of the present disclosure and including a variable clutch mechanism 100 (represented schematically in FIG. 2). In general, the correction tape dispenser 10 includes a housing 12, a supply reel 14, a take-up reel 16, an applicator head 18, a supply of correction tape ribbon 20, and a shaft 22.

The housing 12 is generally conventional in that it can include a pair of housing shells, for example, snapped or otherwise connected together to define a cavity that contains the inner workings of the dispenser 10. The supply and take-up reels 14, 16 of the present embodiment of the correction tape dispenser 10 generally include disks, or disk-shaped members, that are coaxially disposed on the shaft 22 for rotational displacement. The applicator head 18 can resemble any conventional applicator head secured to the housing 12 and including an application edge 24. The correction tape ribbon 20 comprises a length of carrier ribbon 20a and a length of correction tape 20b bonded to the carrier ribbon 20a. The carrier tape ribbon 20 extends from the supply reel 14, around the application edge 24 of the applicator head 18, and to the take-up reel 16.

During operation, a user presses the application edge 24 of the applicator head 18 against a substrate such as a piece of paper, for example, and moves the correction tape dispenser 10 in a direction substantially opposite from the initial location of the applicator head 18. The correction tape 20b carried by the carrier ribbon 20a is formulated to adhere to the substrate. Therefore, the foregoing movement of the correction tape dispenser 10 applies or translates into a pulling force F, which draws the correction tape ribbon 20 from the supply reel 14. This movement causes dispensation of the correction tape 20b from the housing and ultimately for application of the correction tape such that it separates from the carrier ribbon 20a and adheres to the substrate. The spent carrier ribbon 20a is then collected on the take-up reel 16.

As discussed above, the pulling force F required to draw the correction tape 20a off of the supply reel 14 grows steadily throughout the life of the product. The pulling forces F grows because the torque required to draw the correction tape ribbon 20 off of the supply reel 14 remains substantially constant and the radius R of the correction tape ribbon 20 on the supply reel 14 decreases. A substantially constant torque is maintained such that the correction tape ribbon 20 may be drawn off of the supply reel 14 in a consistent manner. Thus, the user of conventional correction tape dispensers must apply a greater pulling force F to the correction tape ribbon 20 as the supply of correction tape ribbon 20 on the supply reel 14 begins to diminish. The correction tape dispenser 10 of the disclosed embodiment, however, includes the variable clutch mechanism 100 to alleviate this concern and to ensure that the user can apply a substantially constant pulling force F to apply the correction tape 20b to a substrate in a consistent manner.

FIGS. 3A-3C depict one embodiment of a variable clutch mechanism 100 constructed in accordance with the principles of the present disclosure and, which may be included as a component of the otherwise conventional correction tape dispenser 10 described above with reference to FIGS. 1 and 2. The variable clutch mechanism 100 includes the supply and take-up reels 14, 16 of the foregoing correction tape dispenser 10, a pressure wheel 102, and a friction element 104.

As illustrated and mentioned above, the supply and take-up reels 14, 16 are co-axially disposed on the shaft 22 of the correction tape dispenser 10 for rotational displacement, and generally comprise disks or disk-shaped members. The supply reel 14 stores a supply of the correction tape ribbon 20, and the take-up reel 16 stores a spent supply of the carrier ribbon 20a. In the disclosed embodiment of the variable clutch mechanism 100, the supply reel 14 includes an inner surface 106, an outer surface 108, an aperture 110, a cylindrical recess 112, and at least one protrusion 114. The take-up reel 16 includes an inner surface 116, an outer surface 118, a sleeve 120, and an annular recess 123. In the present embodiment, the at least one protrusion 114 on the supply reel 14 comprises first and second hemispherical nubs 115a, 115b disposed within the cylindrical recess 112, but generally any geometric shape which provides a contact surface could be used. The first and second nubs 115a, 115b are disposed approximately one hundred and eighty degrees (180°) from each other for facilitating operation of the clutch mechanism 100, as will be described. Due to the orientation of the supply reel 14 in FIGS. 3A and 3C, the second nub 115b is only visible in FIG. 3B. In alternative embodiments, the supply reel 14 can include more or less than two nubs 115a, 115b and the nubs 115a, 115b could be shaped other than hemispherical, as described above. Other relative angular positions of the first and second hemispherical nubs 115a, 115b are also possible. For example, the hemispherical nubs may be disposed approximately one hundred and twenty degrees (120°), ninety degrees (90°), sixty degrees (60°), or forty five degrees (45°) from one another.

The sleeve 120 of the take-up reel 16 can generally include two or more concentric partially cylindrical members extending away from the inner surface 116 of the take-up reel 16 to facilitate and maintain the assembly of the mechanism 100. More specifically, the sleeve 120 defines a bore 124 rotatably disposed on the shaft 22 and extending through the aperture 110 in the supply reel 14. The sleeve 120 further includes a latch 126 that can include one or more generally tooth-like members extending radially outward from the sleeve 120 and engaging the outer surface 108 of the supply reel 14. So configured, the latch 126 serves to prevent the supply and take-up reels 14, 16 from moving away from their intended locations on the shaft 22. During assembly, the two or more partially cylindrical members of the sleeve 120 can be adapted to resiliently compress in the radial direction such that the latch 126 can pass through the aperture 110 in the supply reel 14 before expanding to their natural state, which is shown in FIG. 3A, for example.

Still referring to FIG. 3A, the pressure wheel 102 of the present embodiment of the variable clutch mechanism 100 comprises a generally disk-shaped member adapted for axial displacement along the shaft 22 and between the supply and take-up reels 14, 16. The pressure wheel 102 includes a driven surface 130 and a drive surface 132 disposed on opposite axial faces of the pressure wheel 102. The drive surface 132 comprises an annular surface that is substantially planar or flat. The driven surface 130 includes an annular surface that has varying height H, wherein the height H of the driven surface 130 is defined as the distance between the driven surface 130 and the drive surface 132. So configured, it can also be said that the pressure wheel 102 of the present embodiment has a varying thickness T.

In one embodiment, the driven surface 130 can include a cammed surface that increases in height H from at least one valley 134 to at least one peak 136 for facilitating operation of the variable clutch mechanism 100, as will be described. In the disclosed embodiment, the driven surface 130 includes first and second valleys 134a, 134b and first and second peaks 136a, 136b. The valleys 134a, 134b are disposed approximately one hundred and eighty degrees (180°) from each other and, as such, the first valley 134a is at the forefront of FIGS. 3A-3C, while the second valley 134b is positioned behind the shaft 22. The peaks 136a, 136b are also disposed approximately one hundred and eighty degrees (180°) from each other, with the first peak 136a positioned at the top of the pressure wheel 102 when viewed from the perspective of FIGS. 3A-3C. Other relative angular positions between the valleys 134a and 134b and the peaks 136a and 136b are also possible. For example, the valleys 134 and peaks 136 may be disposed approximately one hundred and twenty degrees (120°), ninety degrees (90°), sixty degrees (60°), or forty five degrees (45°) from one another.

Figure 8:
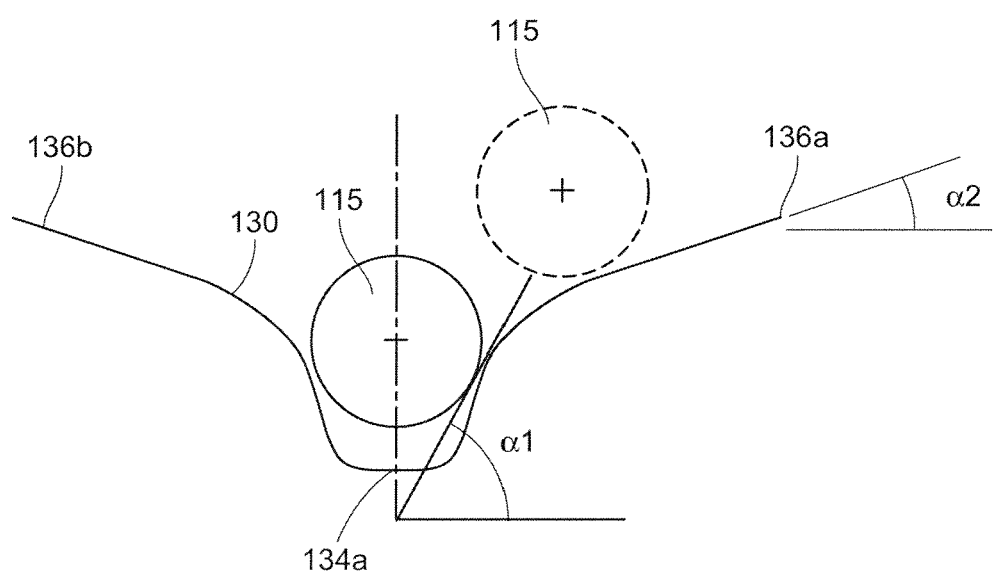
FIG. 8 is a schematic representation of one embodiment of a cammed driven surface of a pressure wheel which can be incorporated into a variable clutch mechanism constructed in accordance with the principles of the present disclosure.

In some embodiments, the driven surface 130 can have a generally constant angle of inclination between the valleys 134a, 134b and the peaks 136a, 136b. In other embodiments, the angle of inclination between the valleys 134a, 134b and the peaks 136a, 136b can vary. For example, FIG. 8 illustrates one embodiment of the driven surface 130 of the pressure wheel 102 having an angle of inclination that varies between the valleys 134a, 134b and the peaks 136a, 136b. Similar to that depicted in FIGS. 3A-3C, the valleys 134a, 134b of the driven surface 130 depicted in FIG. 8 are disposed approximately one hundred and eighty degrees (180°) from each other and, as such, the first valley 134a is at the forefront of FIG. 8, while the second valley 134b is hidden and not visible in FIG. 8. The peaks 136a, 136b are also disposed approximately one hundred and eighty degrees (180°) from each other, with the first peak 136a positioned toward the right and the second peak 136b positioned toward the left, relative to the orientation of FIG. 8. The driven surface 130 of the embodiment depicted in FIG. 8 includes a cammed profile with a pressure angle that varies between a start angle $\alpha 1$, which is located near the valley 134, and a finish angle $\alpha 2$, which is located near the peak 136. In one embodiment, the start angle $\alpha 1$ is greater than the finish angle $\alpha 2$ and the driven surface 130 includes a generally smooth gradual transition between the start angle $\alpha 1$ and the finish angle $\alpha 2$. For example, in one embodiment, the start angle $\alpha 1$ can be between approximately 10.5° and approximately 16°, between approximately 11.5° and approximately 15°, and/or between approximately 12° and approximately 14°, relative to a plane that is parallel to the drive surface 132 of the pressure wheel 102, for example, the start angle $\alpha 1$ can be about 10.5°, about 11.3°, about 12.3°, about 13.3°, about 14.3°, about 15.3°, or about 16° relative to the plane that is parallel to the drive surface 132 of the pressure wheel 102. The finish angle $\alpha 2$ can be approximately between approximately 7.0° and approximately 12.5°, between approximately 8° and approximately 11.5°, and/or between approximately 9° and approximately 10.5°, relative to a plane that is parallel to the drive surface 132 of the pressure wheel 102, for example, the finish angle $\alpha 2$ can be about 7.0°, about 7.8°, about 8.8°, about 9.8°, about 10.8°, about 11.8°, or about 12.5°, relative to a plane that is parallel to the drive surface 132 of the pressure wheel 102. Preferably, the driven surface 130 is configured to have a cam profile with a decreasing pressure angle that provides for a substantially consistent lay-down or pulling force as the nubs 115 travel from the valleys 134a, 134b to the peaks 136a, 136b throughout the lifetime of the product (i.e., as the tape is dispensed from the product), as described herein. In various embodiments, the start angle $\alpha 1$ can be about 10.5° and the finish angle can be about 7.0°, the start angle $\alpha 1$ can be about 11.3° and the finish angle can be about 7.8°, the start angle $\alpha 1$ can be about 12.3° and the finish angle can be about 8.8°, the start angle $\alpha 1$ can be about 13.3° and the finish angle can be about 9.8°, the start angle $\alpha 1$ can be about 14.3° and the finish angle can be about 10.8°, the start angle $\alpha 1$ can be about 15.3° and the finish angle can be about 11.8°, and the start angle α1 can be about 16° and the finish angle can be about 12.5°.

The pressure wheel 102 is disposed between the supply and take-up reels 14, 16 such that the shaft 22 passes through the aperture 128 in the pressure wheel 102. So configured, the pressure wheel 102 is disposed coaxially with the supply and take-up reels 14, 16. Moreover, in the present embodiment, the pressure wheel 102 is disposed within the cylindrical recess 112 of the supply reel 14 such that the driven surface 130 is slidably engaged by and in contact with the protrusion 114. Positioning the pressure wheel 102 in the recess 112 of the supply reel 14 is not necessary, but is advantageous in that it compacts the assembly and reduces the overall dimension of the clutch mechanism 100. This size reduction can create a smaller more aesthetically pleasing and functionally desirable correction tape dispenser 10.

Finally, the friction element 104 of the present embodiment generally comprises an o-ring 138 disposed about the shaft 22 between the pressure wheel 102 and the take-up reel 16. The o-ring can comprise silicone or an elastomeric material such as rubber. Alternatively, an o-ring or a washer made from a foam material may be used. More specifically, the o-ring 138 is partly disposed within the annular recess 123 formed in the inner surface 116 of the take-up reel 16 such that a side of the o-ring that is disposed opposite the take-up reel 16 can be in sliding frictional engagement with the drive surface 132 of the pressure wheel 102. While the friction element 104 of this embodiment has been described as including the o-ring 138, alternative embodiments can include friction elements that may include other friction generating members such as clutch plates, flat rubber washers, viscous fluids, etc. The annular recess 123 in the take-up reel 16 assists in retaining the position of the o-ring 138 relative to the other components and also facilitates a reduction in the overall size of the assembly, which can be beneficial as discussed above. In some embodiments, the o-ring 138 can be fixable within the annular recess 123 with an adhesive or friction fit, for example. Similarly, the o-ring 138 can be injection molded with the take-up reel using a two-shot injection molding process and an elastomeric material to provide the o-ring structure. The o-ring 138 can have a circular cross-section, as depicted, or it may have a square, octagonal, or generally any other shape cross-section. Moreover, the o-ring 138 can be constructed of an elastomeric material such as rubber, any other compressible, resilient material, or generally any other material or combination of materials capable of serving the principles of the present disclosure.

FIGS. 3A-3C depict the variable clutch mechanism 100 in various states of operation. FIG. 3A depicts the mechanism 100 in a state of rest. FIG. 3B depicts the mechanism 100 in a state of initial operation, i.e., wherein the supply reel 14 includes a relatively large supply of correction tape ribbon 20. FIG. 3C depicts the mechanism 100 in a state of final operation, i.e., wherein the supply reel 14 includes a substantially diminished supply of correction tape ribbon 20. The operation of the variable clutch mechanism 100 will now be described with reference to FIGS. 1, 2, and 3A-3C.

In the state of rest depicted in FIG. 3A, the correction tape dispenser 10 is not being used, and therefore, no force F is being applied to draw the correction tape ribbon 20 off of the supply reel 14. Accordingly, the supply and take-up reels 14, 16 do not experience any torque and the system is at rest. In this state, the nubs 115a, 115b of the supply reel 14 are positioned in the valleys 134a, 134b, respectively, of the pressure wheel 102. So configured, the o-ring 138 urges the pressure wheel 102 to its furthest position to the left relative to the orientation of FIGS. 3A-3C, against the nubs 115a, 115b. Moreover, in this state, the o-ring 138 experiences very little, and possibly zero compression, but continues to frictionally engage the driven surface 132 of the pressure wheel 102, thereby maintaining the rotational position of the pressure wheel 102.

Upon a user beginning to use the correction tape dispenser 10, as described above with reference to FIGS. 1 and 2, the user applies a force F to draw the supply of correction tape ribbon 20 off of the supply reel 14. As shown in FIG. 1, for example, the force F applied by the user imparts a torque τ on the supply reel 14 (which constitutes the product of the force F multiplied by the radius R of the supply of correction tape ribbon 20), as shown in FIG. 1. In FIGS. 3A and 3B, the supply reel 14 accommodates a quantity of correction tape ribbon 20 having a radius R1, which is drawn by the user from the supply reel 14. As such, the force F applied by the user initially causes the supply reel 14 to rotate relative to the pressure wheel 102 and into the position depicted in FIG. 3B. That is, the supply reel 14 rotates relative to pressure wheel 102 in a manner that moves the first nub 115a downward relative to the orientation of FIG. 3A, and the second nub 115b upward relative to the orientation of FIG. 3A (where it was previously obscured as described above). As the supply reel 14 rotates, friction between the drive surface 132 of the pressure wheel 102 and the friction element 104 maintains the rotational position of the pressure wheel 102 until the nubs 115a, 115b carried by the supply reel 14 impart sufficient torque to the driven surface 130 to cause rotation of the pressure wheel 102.

That is, as the supply reel 14 and nubs 115a, 115b begin to rotate, the pressure wheel 102 and its driven surface 130 remain substantially fixed due to the friction generated between the friction element 104 and the drive surface 132. As such, the nubs 115a, 115b rotate relative to the driven surface 130 of the pressure wheel 102 and begin to climb toward the peaks 136a, 136b, respectively. As the nubs 115a, 115b climb toward the peaks 136a, 136b, the nubs 115a, 115b simultaneously displace the pressure wheel 102 axially to the right, relative to the orientation of FIGS. 3A-3C, and away from the supply reel 14 because the supply reel 14 is fixed against axial displacement to the left beyond the latch 126 of the sleeve 120 of the take-up reel 16. As this occurs, the drive surface 132 of the pressure wheel 102 axially compresses the o-ring 138 against the take-up reel 16. This increases the amount of friction generated between the o-ring 138 and the pressure wheel 102, and also the magnitude of an axial force applied to the pressure wheel 102 by the compressed o-ring 138, which enables at least some of the torque τ that is imparted on the supply reel 14 to be transferred to the take-up reel 16 via the pressure wheel 102. This, in turn, causes the take-up reel 16 to rotate in the same direction as the supply reel 14 to collect the used carrier ribbon 20a, as described above with reference to FIGS. 1 and 2. The ratio at which the take-up reel 16 rotates relative to the supply and pressure wheels 14, 102, however, depends on the amount of friction generated by the variable clutch mechanism 100. This can be illustrated with reference to FIG. 3C.

FIG. 3C depicts the correction tape dispenser 10 in a state of diminished supply of correction tape ribbon 20. Specifically, the supply of correction tape ribbon 20 on the supply reel 14 of FIG. 3C has a radius R2 that is significantly smaller than the radius R1 shown in FIGS. 3A and 3B. Accordingly, when a user applies the same amount of force F to draw the correction tape ribbon 20 off of the supply reel 14, the torque τ imparted on the supply reel 14, which is the product of the force F multiplied by the radius R2, is much smaller than the torque τ imparted on the supply reel 14 of FIGS. 3A and 3B.

This smaller torque τ rotates the supply reel 14 a smaller distance relative to the pressure wheel 102 because the incline of the driven surface 130 between the valleys 134a, 134b and the peaks 136a, 136b more easily resists the smaller torque τ, thereby preventing the nubs 115a, 115b from climbing the inclines of the driven surface 130 as far toward the peaks 136a, 136b. Because the nubs 115a, 115b climb a smaller distance toward the peaks 136a, 136b, the pressure wheel 102 moves a smaller distance away from the supply reel 14 and compresses the o-ring 138 to a lesser extent. As such, the extent to which the o-ring 138 is compressed in FIG. 3C generates less friction against the drive surface 132 of the pressure wheel 102 than the o-ring of FIG. 3B. This reduced friction allows the supply reel 14 to "slip" relative to the take-up reel 16 as the user applies the pulling force F, thereby transferring less torque τ from the supply reel 14 to the take-up reel 16. So configured, in FIG. 3C, the take-up reel 16 rotates at a rate that is less than the rate at which the supply reel 14 rotates, which ensures that the take-up reel 16 collects the used carrier ribbon 20a at substantially the same rate as the supply reel 14 dispenses the correction tape ribbon 20.

In view of the foregoing, it should be appreciated that the clutch mechanism 100 depicted in FIGS. 3A-3C is also arranged and configured to automatically vary the rotational rate of the take-up reel 16 as a function of the amount of correction tape ribbon 20 stored on the supply reel 14. That is, when the correction tape dispenser 10 is relatively new and the supply reel 14 includes a relatively large supply of correction tape ribbon 20, the supply and take-up reels 14, 16 rotate at a generally common rate because the pressure wheel 102 applies a relatively large compressive force to the o-ring 138, thereby generating a relatively large amount of friction between the supply and take-up reels 14, 16. This large amount of friction can, in some instances, essentially fix the supply and take-up reels 14, 16 together.

As the supply of correction tape ribbon 20 on the supply reel 14 diminishes, the radius of the supply of correction tape ribbon 20 diminishes and the radius of the collected carrier ribbon 20a on the take-up reel 16 increases. Therefore, to ensure that the rate at which the correction tape ribbon 20 is drawn off of the supply reel 14 is substantially the same as the rate at which the carrier ribbon 20a is collected by the take-up reel 16, the rotational rate of the supply reel 14 must either increase, or the rotational rate of the take-up reel 16 must decrease. In the disclosed embodiment, the rotational rate of the take-up reel 16 is decreased by reducing the compressive force applied by the pressure wheel 102 to the o-ring 138, which reduces the amount of friction between the supply and take-up reels 14, 16. This relatively reduced amount of friction allows the supply reel 14 and pressure wheel 102 to slip relative to the take-up reel 16, which enables the take-up reel 16 to collect the spent carrier ribbon at the same rate that the correction tape is removed from the supply reel 14.

This variable clutch mechanism 100 therefore automatically adjusts the rate at which the take-up reel 16 rotates relative to the supply reel 14 to ensure that the correction tape ribbon 20 is smoothly transferred from the supply reel 14 such that the carrier ribbon 20a is collected by the take-up reel 16 without generating too much or too little tension in the correction tape ribbon 20 and/or carrier ribbon 20a, thereby avoiding operational inconsistencies such as tearing and/or looping.

Figure 4:
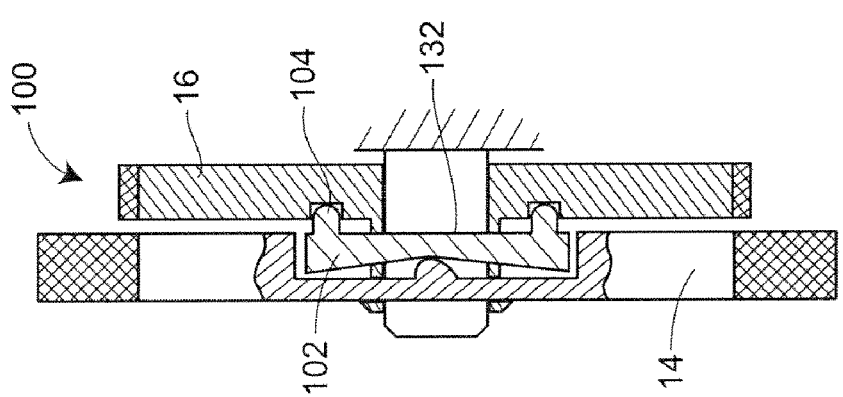
FIG. 4 is a partial cross-sectional side view of an alternative embodiment of a variable clutch mechanism incorporated into a correction tape dispenser and constructed in accordance with the principles of the present disclosure.

While the friction element 104 of the embodiment of the variable clutch mechanism 100 depicted in FIGS. 3A-3C includes an o-ring 138 that is separate and distinct from the other components of the system, alternative and/or modified embodiments can be constructed differently. For example, FIG. 4 depicts one modified embodiment of the variable clutch mechanism 100 of FIGS. 3A-3C wherein the friction element 104 is integrally formed, i.e., as one-piece, with the pressure wheel 102. The variable clutch mechanism 100 of FIG. 4 is otherwise identical to the variable clutch mechanism 100 of FIGS. 3A-3C in both structure and function. The friction element 104 of FIG. 4 is formed as a deformable and resilient annular ring protruding from the drive surface 132 of the pressure wheel 102 to effectuate the operation of the variable clutch mechanism 100, as described above. In the disclosed embodiment, the integral friction element 104 includes a generally semicircular cross-section, but other cross-sectional shapes are intended to be within the scope of the present disclosure. Finally, the friction element 104 and pressure wheel 102 of FIG. 4 can be formed using a co-extrusion process, a co-molding process, or any other manufacturing process, or combination of manufacturing processes, capable of forming the pressure wheel 102 and friction element 104 either in the same process generally simultaneously, or in different processes at different times.

While the variable clutch mechanism 100 described thus far utilized a resilient and deformable friction element 104 for effectuating the operation thereof, other embodiments can be constructed to utilize more rigid friction generating components.

Figure 5:
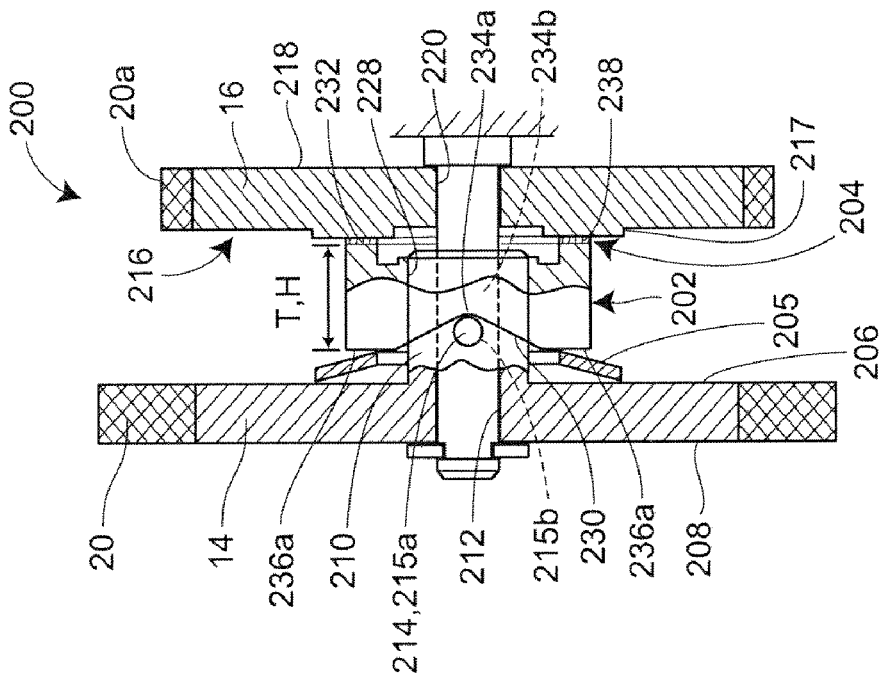
FIG. 5 is a partial cross-sectional side view of another alternative embodiment of a variable clutch mechanism incorporated into a correction tape dispenser and constructed in accordance with the principles of the present disclosure.

FIG. 5 depicts an alternative variable clutch mechanism 200 constructed in accordance with the principles of the present disclosure, and which includes a friction element 204 that comprises a clutch plate, as will be described. Similar to the variable clutch mechanism 100 described above, and for the sake of explanation, the clutch mechanism 200 of FIG. 5 is disclosed as a component of the correction tape dispenser 10 depicted in FIGS. 1 and 2. The variable clutch mechanism 200 therefore includes the supply and take-up reels 14, 16 of the correction tape dispenser 10, a pressure wheel 202, and the friction element 204.

In the disclosed embodiment, the supply reel 14 includes an inner surface 206, an outer surface 208, a cylindrical boss 210 extending from the inner surface 206, a through-bore 212, and at least one protrusion 214 extending radially outward from the boss 210. The take-up reel 16 includes an inner surface 216, an outer surface 218, and an aperture 220. As illustrated and mentioned above, the supply and take-up reels 14, 16 are coaxially disposed for rotational displacement on the shaft 22 of the correction tape dispenser 10, and generally comprise disks or disk-shaped members. More specifically, the shaft 22 of the correction tape dispenser 10 extends through the through-bore 212 of the supply reel 14 and the aperture 220 of the take-up reel 16 to rotationally support these components. The supply reel 14 stores a supply of the correction tape ribbon 20, and the take-up reel 16 stores a spent supply of the carrier ribbon 20a.

In the present embodiment, the at least one protrusion 214 on the boss 210 of the supply reel 14 comprises first and second generally cylindrical pins 215a, 215b, only the first of which is visible in FIG. 5 because the pins 215a, 215b are disposed approximately one hundred and eighty degrees (180°) from each other. The visible pin 215a extends generally normal to the plane through which the cross-section of FIG. 5 is take, and therefore, out of the page. The pins 215a, 215b are for effectuating operation of the clutch mechanism 200, as will be described. In alternative embodiments, the supply reel 14 can include more or less than two pins 215a, 215b and the pins 215a, 215b can be shaped other than generally cylindrical. Moreover, in alternate embodiments, the relative angular positions between the one or more pins 215 are also possible. For example, the pins 215 may be disposed approximately one hundred and twenty degrees (120°), ninety degrees (90°), sixty degrees (60°), or forty five degrees (45°) from one another.

The pressure wheel 202 of the present embodiment of the variable clutch mechanism 200 comprises a generally disk-shaped member adapted for axial displacement along the shaft 22 and between the supply and take-up reels 14, 16. The pressure wheel 202 includes a driven surface 230 and a drive surface 232 disposed on opposite axial end faces of the pressure wheel 202. The drive surface 232 comprises an annular surface that is substantially planar or flat. The driven surface 230 includes an annular surface that has a varying height H, wherein the height H of the driven surface 230 is defined as the distance between the driven surface 230 and the drive surface 232. So configured, it can also be said that the pressure wheel 202 of the present embodiment has a varying thickness T.

In one embodiment, the driven surface 230 can include a cammed surface which increases in height H from at least one valley 234 to at least one peak 236 for facilitating operation of the variable clutch mechanism 200. In the disclosed embodiment, the driven surface 230 includes two valleys 234a, 234b and two peaks 236a, 236b similar to the driven surface 130 of the pressure wheel 102 of the embodiment of the variable clutch mechanism 100 described above with reference to FIGS. 3A-3C. Of course, more or less than two valleys 234 and two peaks 236 may be employed. For example, the driven surface 230 may alternatively include one, three, four, five, six, seven, eight, or more valleys 234 and peaks 236.

As illustrated, the pressure wheel 202 of FIG. 5 is disposed between the supply and take-up reels 14, 16 such that the shaft 22 passes through an aperture 228 in the pressure wheel 202. So configured, the pressure wheel 202 is disposed coaxially with the supply and take-up reels 14, 16. Moreover, as depicted in FIG. 5, the present embodiment of the variable clutch mechanism 200 includes a biasing member 205 disposed between the supply reel 14 and the driven surface 230 of the pressure wheel 202 to bias the pressure wheel 202 toward the take-up reel 16. In some embodiments, the biasing member 205 can comprise a spring such as, for example, a "Belleville" spring, which is a resilient cup-shaped washer element.

Finally, the friction element 204 of the embodiment of FIG. 5 includes a clutch plate 238, as mentioned above. The clutch plate 238 is carried by the drive surface 232 of the pressure wheel 202 and therefore is a generally annular flat shaped plate. The clutch plate 238 can be constructed of generally any friction generating material such as ceramic, metal, plastic, silica, etc. or generally any other material or combination of materials capable of serving the principles of the present disclosure.

During operation, the clutch mechanism 200 of FIG. 5 operates substantially similarly to the clutch mechanism 100 described above with reference to FIGS. 3A-3C. For example, as a user applies a force F to draw the correction tape ribbon 20 off of the supply reel 14, the pins 215a, 215b rotate relative to the pressure wheel 202 such that they at least partly climb the inclines of the driven surface 230 from the valleys 234a, 234b toward the peaks 236. As the pins 215a, 215b climb the inclined surfaces, the pins 215a, 25b simultaneously push the pressure wheel 202 toward the take-up reel 16 such that the clutch plate 238 is forced into the inner surface 216 thereof to generate friction. In some embodiments, the inner surface 216 of the take-up reel 16 can include a clutch face 217, as shown in FIG. 5, for frictional engagement with the clutch plate 238. The clutch face 217 can extend away from the inner surface 216 of the take-up reel 16 and can be generally annular in shape to correspond to the shape of the clutch plate 238. The distance that the pins 215a, 215b move the pressure wheel 202 and therefore, the amount of axial friction generated by the clutch plate 238 is dependent on amount of toque τ imparted on the supply reel 14 during operation. While the variable clutch mechanism 200 of FIG. 5 is disclosed as including a single clutch plate 238 operably engaging the take-up reel 16 through the operation of a cammed pressure wheel 202, alternative variable clutch mechanisms constructed in accordance with the principles of the present disclosure can include two or more clutch plates, for example, and alternative mechanisms for varying the magnitude of the friction generated thereby. One such alternative mechanism for varying the magnitude of friction is described with reference to FIG. 6.

FIG. 6 depicts another alternative variable clutch mechanism 300 constructed in accordance with the principles of the present disclosure, and which has a friction element 304 including an inner clutch plate 338a and an outer clutch plate 338b. Similar to the variable clutch mechanisms 100, 200 described above, and for the sake of explanation, the clutch mechanism 300 of FIG. 6 is disclosed as a component of the correction tape dispenser 10 depicted in FIGS. 1 and 2. The variable clutch mechanism 300 therefore includes the supply and take-up reels 14, 16 of the correction tape dispenser 10, a pressure wheel 302, and the friction element 304.

In the embodiment of FIG. 6, the supply reel 14 includes an inner surface 306, an outer surface 308, and an aperture 310 including at least one protrusion 312. In the present embodiment, the at least one protrusion 312 of the supply reel 14 includes a plurality of internal threads 313. The take-up reel 16 includes an inner surface 316, an outer surface 318, a cylindrical boss 314 extending from the inner surface 316, and a through-bore 320 extending through the boss 314. As illustrated and mentioned above, the supply and take-up reels 14, 16 are disposed for rotational displacement on the shaft 22 of the correction tape dispenser 10, and generally include disks or disk-shaped members. More specifically, the shaft 22 of the correction tape dispenser 10 extends through the through-bore 320 of the take-up reel 16 and the aperture 310 of the supply reel 14 and supports the components. The supply reel 14 stores a supply of the correction tape ribbon 20, and the take-up reel 16 stores a spent supply of the carrier ribbon 20a.

The pressure wheel 302 of the present embodiment of the variable clutch mechanism 300 includes a generally disk-shaped member adapted for axial displacement along the shaft 22 and between the supply and take-up reels 14, 16. The pressure wheel 302 includes a driven surface 330 and a drive surface 332. In the present embodiment, the driven surface 330 includes a plurality of external threads 333 disposed on an outer radial surface of the pressure wheel 302 and in meshing engagement with the plurality of internal threads 312 on the supply reel 14. The drive surface 332 comprises an annular surface that is substantially planar or flat and can, as depicted, protrude outward from the remainder of the pressure wheel 302 in the axial direction toward the take-up reel 16.

As illustrated, the pressure wheel 302 of FIG. 6 is disposed between the supply and take-up reels 14, 16 such that the shaft 22 passes through the through-bore 320 of the cylindrical boss 314 of the take-up reel 16. The pressure wheel 302 moreover includes an aperture 328 that is disposed on the cylindrical boss 314 of the take-up reel 16. So configured, the pressure wheel 302 is disposed coaxially with the supply and take-up reel 14, 16. Moreover, as depicted in FIG. 6, the present embodiment of the variable clutch mechanism 300 includes a biasing member 305 disposed between a retainer clip 319, which is secured to an end of the cylindrical boss 314, and the pressure wheel 302 to bias the pressure wheel 302 toward the take-up reel 16. In some embodiments, the biasing member 305 can include a spring such as a Belleville spring.

Finally, as mentioned above, the friction element 304 of the embodiment of FIG. 6 includes the inner and outer clutch plates 338a, 338b. The inner clutch plate 338a is a generally annular flat shaped plate that is carried by an annular protrusion 325 extending from the pressure wheel 302 and defining the drive surface 332. Due to the bias of the biasing member 305, the inner clutch plate 338a is adapted to generate axial friction between the pressure wheel 302 and the take-up reel 16. Therefore, the inner clutch plate 338a can be constructed of generally any friction generating material such as ceramic, metal, plastic, silica, etc. or any other material or combination of materials capable of serving the principles of the present disclosure.

The outer clutch plate 338b is also a generally annular flat shaped plate, but is carried by an annular protrusion 327 extending from the inner surface 306 of the supply reel 14. The outer clutch plate 338b is adapted to generate varying degrees of axial friction between the supply and take-up reels 14, 16 to effectuate operation of the variable clutch mechanism 300, as will be described. Therefore, the outer clutch plate 338b is typically constructed of a compliant, deformable, and/or resilient material, alone, or in combination with one or more friction generating materials as described herein.

During operation of the variable clutch mechanism 300 of FIG. 6, a user applies a force F to draw the correction tape ribbon 20 off of the supply reel 14 as described above with reference to FIGS. 1 and 2. This force F causes the internal threads 312 of the supply reel 14 to slide relative to the external threads 333 of the pressure wheel 302, which moves the supply reel 14 in the axial direction toward the take-up reel 16. This causes the outer clutch plate 338b carried by the supply reel 14 to forcefully engage and compress against the take-up reel 16. More specifically, the outer clutch plate 338b forcefully engages an outer annular protrusion 317b extending from the inner surface 316 of the take-up reel 16. The amount of axial friction generated between the supply and take-up reels 14, 16 by the outer clutch plate 338b depends on the degree to which the outer clutch plate 338b axially compresses. Moreover, the degree to which the outer clutch plate 338b compresses depends on the magnitude of the torque τ imparted on the supply reel 14 by the user, similar to that described above with respect to the variable clutch mechanisms 100, 200 depicted in FIGS. 3A-3C, 4, and 5. As such, it should be appreciated that the outer clutch plate 338b of the present embodiment is arranged and configured to generate a variable amount of friction between the supply the take-up reels 14, 16, which in turn ensure proper operation of the correction tape dispenser 10. Furthermore, in this embodiment, the compression of the outer clutch plate 338b further operates to provide a restoring force to the system, which automatically moves the supply reel 14 back toward its original position when the user ceases applying the correction tape 20b. While the variable clutch mechanisms 100, 200, 300 disclosed thus far operate through the implementation of friction elements 104, 204, 304 that include o-rings or traditional clutch plates, further alternative mechanisms for varying the magnitude of the friction between the supply and take-up reels 14, 16 are intended to be within the scope of the present disclosure.

For example, FIG. 7 depicts another alternative variable clutch mechanism 400 constructed in accordance with the principles of the present disclosure, and which has a friction element 404 including a compliant hub 438. Similar to the variable clutch mechanisms 100, 200, 300 described above, and for the sake of explanation, the clutch mechanism 400 of FIG. 7 is disclosed as a component of the correction tape dispenser 10 depicted in FIGS. 1 and 2. The variable clutch mechanism 400 therefore includes the supply and take-up reels 14, 16 of the correction tape dispenser 10, a pressure wheel 402, and the friction element 404.

In the embodiment of FIG. 7, the supply reel 14 includes an inner surface 406, an outer surface 408, an aperture 410 including at least one protrusion 412. In the present embodiment, the at least one protrusion 412 includes a plurality of internal threads 413. The take-up reel 16 includes an inner surface 416, an outer surface 418, a cylindrical boss 414 extending from the inner surface 416, a through-bore 420 extending through the boss 414, and a cylindrical collar 417 spaced radially outward from the cylindrical boss 414. As illustrated and mentioned above, the supply and take-up reels 14, 16 are disposed for rotational displacement on the shaft 22 of the correction tape dispenser 10, and generally include disks or disk-shaped members. More specifically, the shaft 22 of the correction tape dispenser 10 extends through the through-bore 420 of the cylindrical boss 414 of the take-up reel 16 and the aperture 410 of the supply reel 14 to rotationally support these components. Moreover, as illustrated, the supply and take-up reels 14, 16 of the present embodiment are fixed against axial displacement relative to each other via correspondingly mating cylindrical tongue-and-groove type flanges 319a, 319b extending from the inner surfaces of the supply and take-up reels 14, 16, respectively. The supply reel 14 stores a supply of the correction tape ribbon 20, and the take-up reel 16 stores a spent supply of the carrier ribbon 20a.

The pressure wheel 402 of the present embodiment of the variable clutch mechanism 400 is adapted for axial displacement along the shaft 22 and relative to the supply and take-up reels 14, 16. The pressure wheel 402 includes a drive portion 402a and a clutch portion 402b. The drive portion 402a includes a generally annular disk-shaped member defining a driven surface 430 having a plurality of external threads 433. The plurality of external threads 433 are disposed on the outer radial surface of the pressure wheel 402 and in meshing engagement with the plurality of internal threads 413 of the supply reel 14.

The clutch portion 402b of the pressure wheel 402 includes a generally hollow cylindrical member that serves as the friction element 404, and which is disposed between the cylindrical boss 414 and the cylindrical collar 417 of the take-up reel 16. The clutch portion 402b further includes a bull-nosed external surface 403 in sliding engagement with an inner cylindrical surface 417a of the cylindrical collar 417 for generating variable amounts of friction between the pressure wheel 402 and the take-up reel 16 during operation of the variable clutch mechanism 400.

For example, during operation of the variable clutch mechanism 400 of FIG. 7, a user applies a force F to draw the correction tape ribbon 20 off of the supply reel 14 as described above with reference to FIGS. 1 and 2. This force F causes the internal threads 413 of the supply reel 14 to slide relative to the external threads 433 of the pressure wheel 402, which moves the pressure wheel 402 in the axial direction toward the take-up reel 16. This causes the bull-nosed surface 403 of the clutch portion 402b to forcefully and frictionally engage the inner cylindrical surface 417a of the cylindrical collar 417 of the take-up reel 16. The amount of friction generated between the bull-nosed surface 403 and the cylindrical collar 417 depends on the magnitude of the torque τ imparted on the supply reel 14 by the user, similar to that described above with respect to the variable clutch mechanisms 100, 200, 300 depicted in FIGS. 3A-3C, 4, 5, and 6. As such, it should be appreciated that the clutch portion 402b of the pressure wheel 402 of the present embodiment is arranged and configured to generate a variable amount of friction between the supply the take-up reels 14, 16, which in turn ensures proper operation of the correction tape dispenser 10. Furthermore, in some embodiments, the clutch portion 402b of the pressure wheel 402 can be constructed of a resilient, deformable material such that the bull-nosed surface 403 at least partly compresses as it is forced against the inner cylindrical surface 417a of the cylindrical collar 417 of the take-up reel 16. So configured, the resilience of the clutch portion 402b can naturally bias the pressure wheel 402 back into the position depicted in FIG. 7 when the user ceases applying the correction tape 20b.

In view of the foregoing, each of the various variable clutch mechanisms 100, 200, 300, 400 disclosed herein are adapted to optimize the application of correction tape 20b carried on a supply of correction tape ribbon 20 by ensuring that the rate at which the spent carrier ribbon 20a is collected on the take-up reel 16 is substantially the same as the rate at which the correction tape ribbon 20 is drawn off of the supply reel 14 regardless of the magnitude of the force F applied to the correction tape ribbon 20 by the user. This is achieved by varying a frictional force between the supply and take-up reels 14, 16 generated by a friction element 104, 204, 304, 404. That is, when the supply of correction tape ribbon 20 is relatively large, it can be advantageous for the supply and take-up reels 14, 16 to rotate at substantially the same rate because the radius of the supply of correction tape ribbon 20 can be relatively similar to the radius of the spent carrier ribbon 20a collected on the take-up reel 16. Moreover, when the supply of correction tape ribbon 20 is low, it can be advantageous for the supply reel 14 to rotate at orate that is greater than the rate at which the take-up reel 16 rotates because the radius of the supply of correction tape ribbon 20 can be smaller than the radius of the carrier ribbon 20a collected on the take-up reel 16. Thus, each of the foregoing embodiments of the variable clutch mechanism 100, 200, 300, 400 are capable of providing similar advantages and benefits.

While the present disclosure has expressly described various embodiments of variable clutch mechanisms, the invention is not intended to be limited by any of the features described herein. Rather, the invention is to be defined by the spirit and scope of the following claims, including all equivalents thereof.

What is claimed is:

1. A clutch mechanism, comprising:
a first rotating disk defining at least one protrusion;
a second rotating disk disposed coaxially with the first rotating disk;
a pressure wheel disposed coaxially with and between the first and second rotating disks, the pressure wheel operably engaged by the at least one protrusion, the at least one protrusion movable between at least a first rotational position and a second rotational position relative to the pressure wheel; and
a friction element disposed between the pressure wheel and the second rotating disk such that the friction element generates a first frictional force between the pressure wheel and the second rotating disk when the at least one protrusion is in the first rotational position and a second frictional force between the pressure wheel and the second rotating disk when the at least one protrusion is in the second rotational position,
wherein the pressure wheel comprises a cammed surface facing the first rotating disk and the at least one protrusion carried by the first rotating disk comprises a nub slidably engaging the cammed surface.

2. The clutch mechanism of claim 1, wherein the pressure wheel and the friction element are separate components.

3. The clutch mechanism of claim 2, wherein the friction element comprises an o-ring.

4. The clutch mechanism of claim 2, wherein the friction element comprises a clutch plate.

5. The clutch mechanism of claim 1, wherein the friction element is formed integral with the pressure wheel.

6. The clutch mechanism of claim 5, wherein the friction element comprises an annular elastic protrusion extending from the pressure wheel.

7. The clutch mechanism of claim 1, further comprising a recess formed in the first rotating disk, wherein at least a portion of the pressure wheel is disposed within the recess.

8. A tape dispenser, comprising:
a housing;
an applicator head carried by the housing;
a supply reel supported within the housing and adapted to carry a supply of correction tape adapted to be applied to a substrate by the applicator head, the supply reel defining at least one protrusion;
a take-up reel supported within the housing and disposed coaxially with the supply reel, the take-up reel for collecting a carrier ribbon after the correction tape is applied to the substrate;
a pressure wheel disposed coaxially with and between the supply and take-up reels, the pressure wheel operably engaged by the at least one protrusion, the at least one protrusion movable between a first rotational position and a second rotational position relative to the pressure wheel; and
a friction element disposed between the pressure wheel and the take-up reel such that the friction element generates a first frictional force between the supply and take-up reels when the at least one protrusion is in the first rotational position and a second frictional force between the supply and take-up reels when the at least one protrusion is in the second rotational position.

9. The tape dispenser of claim 8, wherein the pressure wheel and the friction element are separate components.

10. The tape dispenser of claim 9, wherein the friction element comprises an o-ring.

11. The tape dispenser of claim 9, wherein the friction element comprises a clutch plate.

12. The tape dispenser of claim 8, wherein the friction element is formed integral with the pressure wheel.

13. The tape dispenser of claim 12, wherein the friction element comprises an annular elastic protrusion extending from the pressure wheel.

14. The tape dispenser of claim 8, wherein the pressure wheel comprises a cammed surface facing the supply reel and the at least one protrusion carried by the supply reel comprises a nub slidably engaging the cammed surface.

15. The tape dispenser of claim 8 wherein the at least one protrusion carried by the supply reel comprises a plurality of threads threadably engaging the pressure wheel.

16. The tape dispenser of claim 8, further comprising a recess formed in the supply reel, wherein at least a portion of the pressure wheel is disposed within the recess.

17. The tape dispenser of claim 8, further comprising a shaft carried by the housing and rotationally supporting the supply reel, the take-up reel, and the pressure wheel.

18. A correction tape dispenser, comprising:
a housing carrying an applicator head and a shaft;
a supply reel rotationally supported on the shaft and defining a nub;
a take-up reel rotationally supported on the shaft adjacent to the supply reel;
a carrier ribbon carrying a supply of correction tape, the carrier ribbon extending from the supply reel, around the applicator head, and to the take-up reel;
a pressure wheel disposed on the shaft between the supply and take-up reels, the pressure wheel defining a cammed surface that is operably engaged by the nub,
the supply reel movable relative to the pressure wheel such that the nub is movable relative to the cammed surface between a first rotational position and a second rotational position,
the pressure wheel movable relative to the supply reel between a first axial position when the nub is in the first rotational position and a second axial position when the nub is in the second rotational position; and
an o-ring disposed between the pressure wheel and the take-up reel such that the o-ring occupies a first state of compression and generates a first frictional force between the supply and take-up reels when the nub is in the first rotational position and the pressure wheel is in the first axial position, and a second state of compression generating second frictional force between the supply and take-up reels when the nub is in the second rotational position and the pressure wheel is in the second axial position.

19. A clutch mechanism, comprising:
a first rotating disk defining at least one protrusion;
a second rotating disk disposed coaxially with the first rotating disk;
a pressure wheel disposed coaxially with and between the first and second rotating disks, the pressure wheel operably engaged by the at least one protrusion, the at least one protrusion movable between at least a first rotational position and a second rotational position relative to the pressure wheel; and
a friction element disposed between the pressure wheel and the second rotating disk such that the friction element generates a first frictional force between the pressure wheel and the second rotating disk when the at least one protrusion is in the first rotational position and a second frictional force between the pressure wheel and the second rotating disk when the at least one protrusion is in the second rotational position,
wherein the friction element is formed integral with the pressure wheel and comprises an annular elastic protrusion extending from the pressure wheel.

20. A clutch mechanism, comprising:
a first rotating disk defining at least one protrusion;
a second rotating disk disposed coaxially with the first rotating disk;
a pressure wheel disposed coaxially with and between the first and second rotating disks, the pressure wheel operably engaged by the at least one protrusion, the at least one protrusion movable between at least a first rotational position and a second rotational position relative to the pressure wheel; and
a friction element disposed between the pressure wheel and the second rotating disk such that the friction element generates a first frictional force between the pressure wheel and the second rotating disk when the at least one protrusion is in the first rotational position and a second frictional force between the pressure wheel and the second rotating disk when the at least one protrusion is in the second rotational position,
wherein the at least one protrusion carried by the first rotating disk comprises a plurality of threads threadably engaging the pressure wheel.

\* \* \* \* \*